US006577067B2

(12) United States Patent
Hoshi et al.

(10) Patent No.: US 6,577,067 B2
(45) Date of Patent: Jun. 10, 2003

(54) SWITCHING SYSTEM USING LASER INDUCED DISCHARGE

(75) Inventors: Yoshinobu Hoshi, Tsukuba (JP); Hiro Yoshida, Tsukuba (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/752,361

(22) Filed: Dec. 29, 2000

(65) Prior Publication Data

US 2002/0047548 A1 Apr. 25, 2002

(30) Foreign Application Priority Data

Apr. 20, 2000 (JP) ....................................... 2000-119856

(51) Int. Cl.[7] ............................ H05B 41/36; H01S 3/00

(52) U.S. Cl. ........................ 315/149; 315/150; 315/152; 315/155; 372/38.03

(58) Field of Search ................................ 315/149, 150, 315/152, 155, 156, 111.81, 111.21; 313/311, 306, 310; 372/38.1, 38.03, 38.04, 38.05

(56) References Cited

U.S. PATENT DOCUMENTS 5,097,472 A * 3/1992 Chenausky .............. 372/38.04
5,317,574 A * 5/1994 Wang ............................ 372/5
5,676,861 A * 10/1997 Hoshi ..................... 219/69.13

FOREIGN PATENT DOCUMENTS

JP 20000133408 A * 10/1998 ............. H01T/2/00

OTHER PUBLICATIONS

Guenther, et al "The Laser Triggering of High–Voltage Switches", J. Phys. D: Appl. Phys., vol. 11, 1978.

Earley, et al "Firing Characteristics of a Low–Jitter Miniature . . . ", IEEE Transactions of Plasma Science, vol. 18, No. 2, Apr. 1990.

* cited by examiner

*Primary Examiner*—Haissa Philogene
*Assistant Examiner*—Thuy Vinh Tran
(74) *Attorney, Agent, or Firm*—Martin A. Farber

(57) ABSTRACT

A switching system using laser induced discharge is provided which is capable of reliable switching with a simple structure, multiple switching for a number of circuits, good synchronization and no switching time delay among circuits. In the switching system for controlling conduction between electrodes of a switch by discharge between the electrodes, a laser beam is applied to one of the electrodes to make discharge from the other of the electrodes be induced by the laser beam and application of the laser beam is controlled to switch the conduction.

4 Claims, 3 Drawing Sheets

SWITCHING SYSTEM USING LASER INDUCED DISCHARGE

BACKGROUND OF THE INVENTION a) Field of the Invention

The present invention relates to a switching system using laser induced discharge.

b) Description of the Related Art

It is difficult to switch high voltage and large current by mechanical switching using such as an ordinary relay. A practically usable device capable of switching even high voltage and large current is a thyratron. Switching by a thyratron utilizes discharge.

However, a thyratron has a complicated structure and is expensive. Another switching system capable of switching high voltage and large current is a laser trigger gap (LTG) system. With this LTG, as shown in FIG. 3, a spherical electrode 10 is disposed facing another electrode 11 having a laser aperture 12. A laser is radiated from the electrode 10 toward the electrode 11 to generate a plasma plume 14 by which switching is conducted. The feature of LTG resides in that timing and synchronization can be obtained correctly and reliably. With LTG, the number of circuits to be switched is not theoretically limited and multiple switching is possible. However, electrodes and equipments are required to be positioned optically precisely, so that the number of switches is theoretically limited. Under such circumstances, developments on switching through laser induced discharge have been long desired, this switching being capable of realizing multiple switching for a number of circuits, being good in synchronization, and having no switching time delay among circuits.

SUMMARY OF THE INVENTION

The invention has been made under such circumstances. It is an object of the present invention to provide a switching system using laser induced discharge, capable of reliable switching with a simple structure, multiple switching for a number of circuits, good synchronization and no switching time delay among circuits.

In order to achieve the above object of the invention, there is provided a switching system using laser induced discharge for controlling conduction between electrodes of a switch by discharge between the electrodes, wherein a laser beam is applied to one of the electrodes to make discharge from the other of the electrodes be induced by the laser beam and application of the laser beam is controlled to switch the conduction.

DETAILED DESCRIPTION OF THE PREFERRED EMBODIMENTS

An embodiment of the invention will be detailed with reference to the accompanying drawings.

Figure 1:
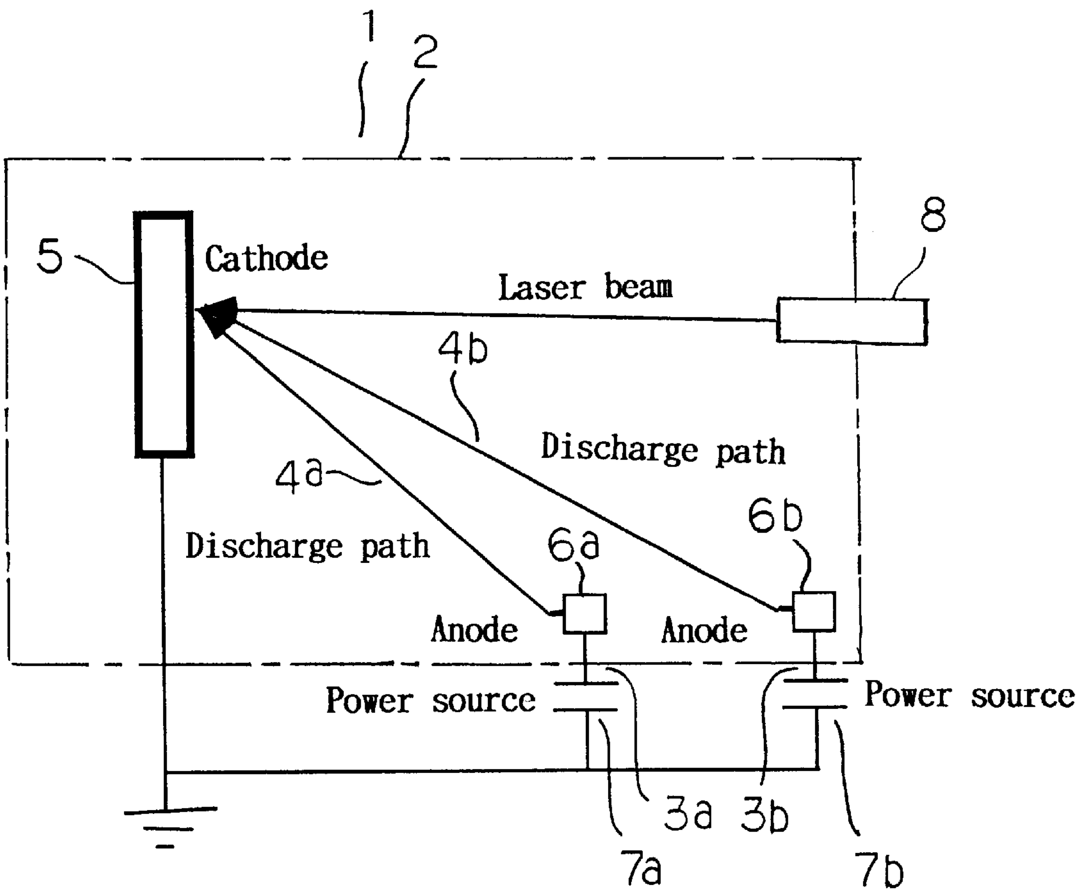
FIG. 1 is a schematic diagram showing the structure of a multiple switching system according to an embodiment of the invention.

In FIG. 1, reference numeral 1 generally represents a multiple switching apparatus. The multiple switching apparatus 1 has a vacuum chamber 2 in which switches 4*a*, 4*b*, . . . of a plurality of circuits 3*a*, 3*b*, . . . are disposed. The switch 4*a* has a cathode 5 and an anode 6*a* constituting a capacitor, and the switch 4*b* has the cathode 5 and an anode 6*b* constituting a capacitor. In this embodiment, although the cathode 5 on the ground side is used in common for both the switches 4*a* and 4*b*, the circuits 3*a* and 3*b* operate independently. The circuits 3*a* and 3*b* have power sources 7*a* and 7*b*, respectively. A laser apparatus 8 is disposed so that a laser can be radiated to the cathode 5. For example, the laser apparatus 8 is a YAG laser apparatus capable of radiating a laser having an output of about 50 mJ and a wavelength of 532 nm.

The multiple switching operation of the multiple switching apparatus 1 constructed as above will be described. First, the inside of the vacuum chamber 2 is evacuated to about 10 Pa. When a laser is applied to the cathode 5, metal plasma (plasma plume) is generated at the cathode and electrons are emitted from the metal plasma. Electrons are attracted by the electric field and reach the two anodes 6*a* and 6*b* to start discharge and complete switching. Two capacitors are discharged via the circuits 3*a* and 3*b*. The plasma plume itself is not utilized as a trigger of discharge.

In this embodiment, switching for two circuits is used. Simultaneous switching for four circuits has been realized. The number of circuits is not theoretically limited so that multiple switching is possible.

In the structure of the apparatus shown in FIG. 1, the anodes 6*a* and 6*b* and cathode 5 were made of copper, the inside of the vacuum chamber 2 was evacuated to 10 Pa, the laser apparatus 8 was a YAG laser having an output of about 50 mJ, a distance between the anode 6*a* and cathode 5 was set to 3 cm, and a distance between the anode 6*b* and cathode 5 was set to 12 cm. Switching was performed at a voltage of 400 V between the anode 6*a* and cathode 5 and at a voltage of 600 V between the anode 6*b* and cathode 5.

Figure 2:
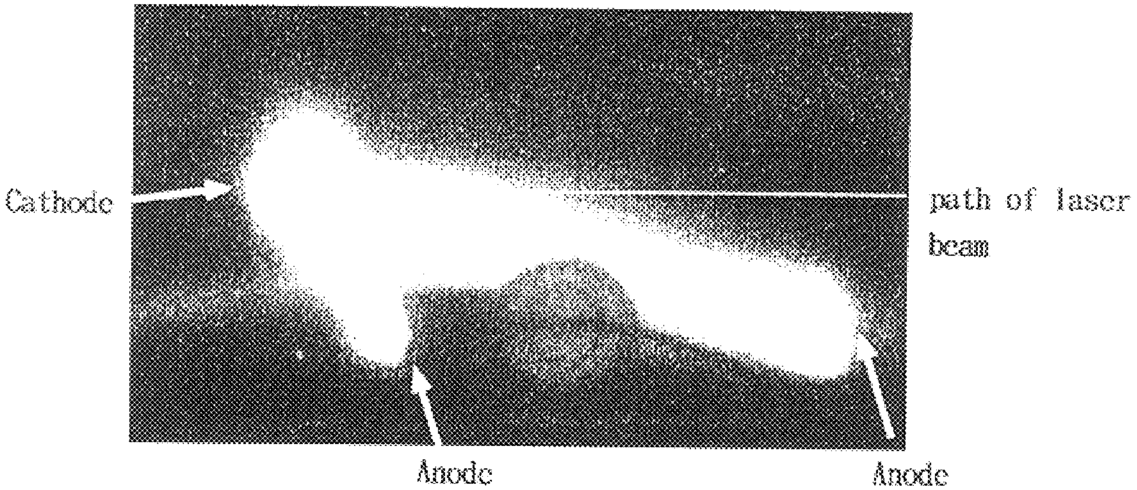
FIG. 2 is a photograph showing an experiment result of multiple switching of this invention.
Figure 3:
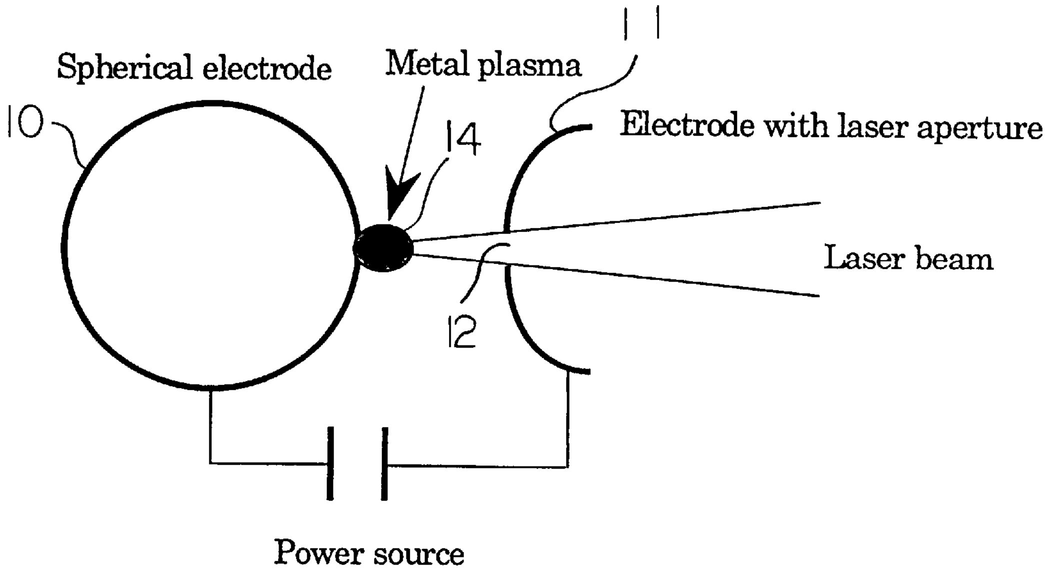
FIG. 3 (PRIOR ART)
FIG. 3 is a schematic diagram explaining the principle of a laser trigger gap (LTG) system.

As shown in the photograph of FIG. 2, discharge occurred at the same time at the anodes 6*a* and 6*b*, the discharge being induced by the laser radiation to the cathode 5, and it was confirmed that synchronous switching occurred.

The multiple switching system of this invention does not use a plasma plume to be generated by laser radiation, but electrons generated from plasma plume are used for discharge. Accordingly, the number of circuits to be multiple-switched is not theoretically limited. A voltage applied to each circuit can be set as desired.

Although LTG can also realize multiple switching, the electrodes and equipments are required to be positioned optically precisely. In most cases, it is necessary to set an cathode and anodes at an equal distance. In contrast, according to the invention, a distance between electrodes is not strict. It is sufficient if a product of a chamber pressure and an inter-electrode distance is in a predetermined range. As in this embodiment, multiple switching is possible even if the distances between electrodes are different.

With the LTG system, discharge starts only when the plasma plume generated by a laser reaches the opposing electrode. Therefore, the inter-electrode distance has a limit in a range from several mm to several cm. In contrast, according to the present invention, the position of the anode 6*b* is remote from the cathode by 12 cm. A position remote from the cathode by 17 cm is also possible.

The multiple switching system of this invention has no limit in voltage and current, similar to the LTG switching system using laser. Generally, the LTG system uses gas at an atmospheric pressure so that the electrodes are consumed and damaged. According to the system of this invention, switching is performed in a vacuum state so that the electrodes are consumed hardly.

In the embodiment, synchronous switching of a number of switches is realized. The invention is also applicable to switching of a single switch.

What we claim are:

1. A switching system using laser induced discharge for controlling conduction between electrodes of each of a plurality of switches by discharge between the electrodes, wherein a laser beam is applied to one of the electrodes of each of the plurality of switches to simultaneously induce discharge from a respective other of the electrodes of each of the plurality of switches and application of the laser beam is controlled to switch the conduction.

2. The system as claimed in claim 1 wherein discharge for the other of the electrodes of each of the plurality of switches is induced by electrons generated by laser radiation.

3. A switching system using laser induced discharge for controlling conduction between electrodes of each of a plurality of switches disposed in a vacuum chamber by discharge between the electrodes, wherein a laser beam is applied to one of the electrodes of each of the plurality of switches to simultaneously induce discharge from a respective other of the electrodes of each of the plurality of switches and application of the laser beam is controlled to switch the conduction.

4. The system as claimed in claim 3 wherein discharge for the other of the electrodes of each of the plurality of switches is induced by electrons generated by laser radiation.

* * * * *